United States Patent
Yang et al.

(10) Patent No.: US 8,120,531 B2
(45) Date of Patent: Feb. 21, 2012

(54) SIGNAL PROCESSING APPARATUS FOR MULTI-MODE SATELLITE POSITIONING SYSTEM AND METHOD THEREOF

(75) Inventors: Chao-Tung Yang, Hsinchu Hsien (TW); Fu-Cheng Wang, Hsinchu Hsien (TW); Shoufang Chen, Hsinchu Hsien (TW); Shuo-Yuan Hsiao, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 165 days.

(21) Appl. No.: 12/719,294

(22) Filed: Mar. 8, 2010

(65) Prior Publication Data

US 2010/0302100 A1    Dec. 2, 2010

(30) Foreign Application Priority Data

Jun. 1, 2009 (TW) .............................. 98117923 A

(51) Int. Cl.
*G01S 19/36* (2010.01)
(52) U.S. Cl. ................................................. 342/357.76
(58) Field of Classification Search .............. 342/357.76
See application file for complete search history.

(56) References Cited

U.S. PATENT DOCUMENTS

2010/0141519 A1 *  6/2010  Rodal ...................... 342/357.12
* cited by examiner

*Primary Examiner* — Harry Liu
(74) *Attorney, Agent, or Firm* — WPAT, PC; Justin King

(57) ABSTRACT

A signal processing apparatus for a multi-mode satellite positioning system includes a band-pass filter, a local oscillator circuit, a first mixing circuit, a second mixing circuit, an analog-to-digital converter and a baseband circuit. By properly allocating a local frequency, radio frequency (RF) signals of a Global Positioning System (GPS), a Galileo positioning system and a Global Navigation System (GLONASS) are processed via a single signal path to save hardware cost.

18 Claims, 4 Drawing Sheets

SIGNAL PROCESSING APPARATUS FOR MULTI-MODE SATELLITE POSITIONING SYSTEM AND METHOD THEREOF

CROSS REFERENCE TO RELATED PATENT APPLICATION

This patent application is based on Taiwan, R.O.C. patent application No. 098117923 filed on Jun. 1, 2009.

FIELD OF THE INVENTION

The present invention relates to the Global Navigation Satellite Systems (GNSS) technology, and more particularly, to a signal processing apparatus for a multi-mode satellite positioning system.

BACKGROUND OF THE INVENTION

As the Northern American Global Positioning System (GPS) gains its popularity, the European Galileo positioning system and the Russian Global Navigation System (GLONASS) are gradually established, and the China Compass Navigation Satellite System (CNSS) is anticipated to be completed in 2020, applications of Global Navigation Satellite Systems (GNSS) shall become more prevailing. Therefore, a GNSS receiver, rather than being limited to a conventional GPS receiver, would be an all-in-one GNSS receiver integrating the GPS, the GLONASS and the Galileo positioning systems. The all-in-one GNSS receiver is capable of receiving different GNSS signals for positioning or simultaneously receiving more than two GNSS signals to position more accurately, so as to provide reliable navigation information.

The GNSS receiver may simultaneously support various positioning systems; however, with respect to the hardware, a large number of signal paths are needed to process signals of different frequency bands. For example, in U.S. Pat. No. 7,358,896, a multi-band GNSS receiver capable of supporting the GPS, the Galileo and the GLONSS positioning systems is provided. The multi-band GNSS receiver has three signal paths for respectively processing signals of three different frequency bands, and accordingly circuit cost is increased. According to the present invention, various GNSS signals are received by integrating radio frequency (RF) receiving circuits to reduce the circuit cost.

SUMMARY OF THE INVENTION

According to an embodiment of the present invention, a signal processing apparatus for a multi-mode satellite positioning system is provided. By properly allocating a local frequency, RF signals of the GPS, the Galileo positioning system and the GLONASS are processed via a single signal path, so that hardware cost can be maintained at a minimum.

According to another embodiment, a signal processing apparatus for a multi-mode satellite positioning system, for receiving a radio frequency (RF) signal to generate a baseband signal corresponding to an operation mode. The signal processing apparatus comprises a band-pass filter, for filtering from the RF signal components uncovered by the multi-mode satellite positioning system to generate a filtered RF signal; a local oscillator circuit, for generating a first oscillation signal and a second oscillation signal according to the operation mode; a first mixing circuit, for mixing the first oscillation signal and the RF filtering signal to generate a mixed signal and processing the mixed signal to generate a first intermediate frequency (IF) signal according to the operation mode; a second mixing circuit, for mixing the second oscillation signal and the first IF signal to generate a mixed signal and filtering image rejection components from the mixed signal to generate a second IF signal; an analog-to-digital converter (ADC), for performing an analog-to-digital conversion on the second IF signal to generate a digital signal; and a baseband circuit, comprising a plurality of baseband processors, for correspondingly activating at least one of the baseband processors and performing a decoding processing on the digital signal to generate the baseband signal according to the operation mode.

According to an embodiment of the present invention, a signal processing apparatus for a multi-mode satellite positioning system, for receiving a RF signal, and to generate a baseband signal corresponding to an operation mode. The signal processing apparatus comprises a band-pass filter, for filtering from the RF signal components uncovered by the multi-mode satellite positioning system to generate a filtered RF signal; a local oscillator circuit, for generating an oscillation signal according to a central frequency determined by the operation mode; a mixing circuit, for mixing the oscillator signal and the RF filtering signal to generate an IF signal; an ADC, for performing an analog-to-digital-processing on the IF signal to generate a digital signal; and a baseband circuit, comprising a plurality of baseband processors, for activating at one of the baseband processors and performing a decoding processing on the digital signal to generate the baseband signal according to the operation mode.

According to an embodiment of the present invention, A signal processing method for a multi-mode satellite positioning system, for receiving an RF signal to generate a baseband signal corresponding to an operation mode. The signal processing method comprises filtering from the RF signal components uncovered by the multi-mode satellite positioning system to generate a filtered RF signal; generating a first oscillation signal and a second oscillation signal according to the operation mode; mixing the first oscillation signal and the RF filtering signal to generate a first mixed signal, and processing the first mixed signal to generate a first IF signal according to the operation mode; mixing the second oscillator and the first IF signal to generate a second mixed signal, and filtering image rejection components form the second mixed signal to generate a second IF signal; performing an analog-to-digital conversion on the second IF signal to generate a digital signal; and performing a baseband signal processing on the digital signal to generate the baseband signal.

The advantages and spirit related to the present invention can be further understood via the following detailed description and drawings.

DETAILED DESCRIPTION OF THE PREFERRED EMBODIMENT

Figure 1:
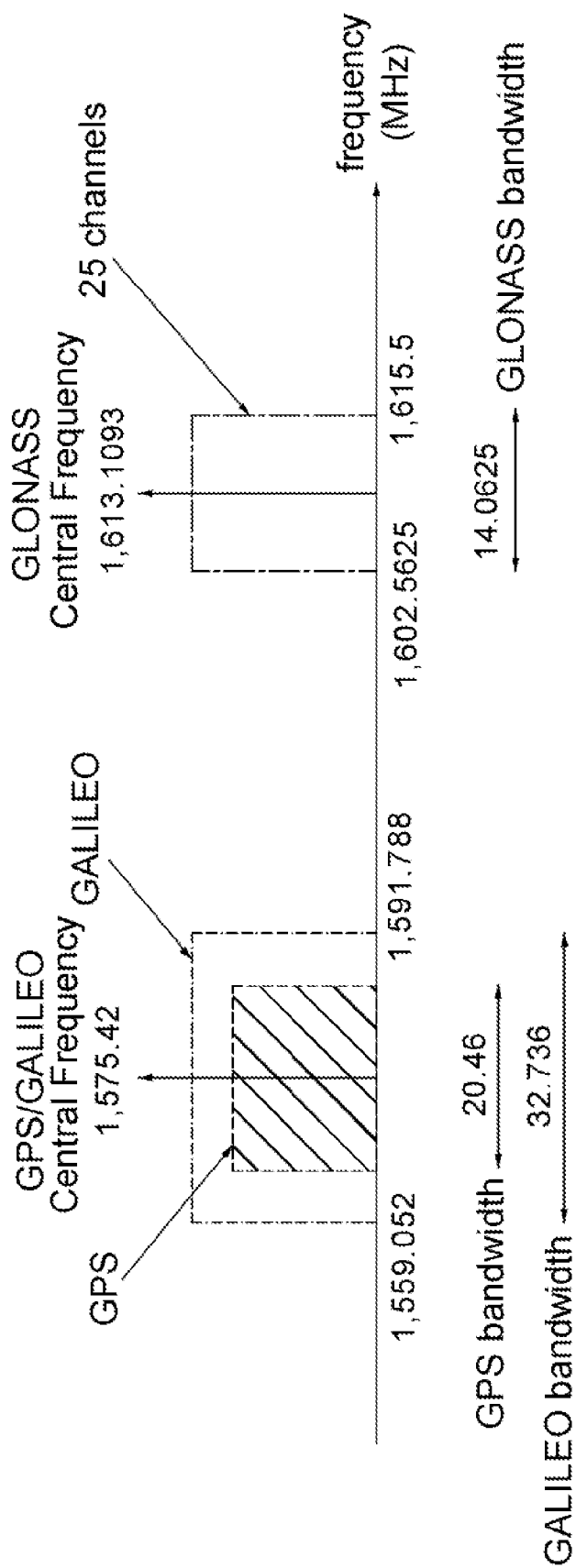
FIG. 1 is a spectrum distribution diagram of the GPS, Galileo and GLONASS positioning systems.

FIG. 1 is a spectrum distribution diagram of the GPS, the Galileo positioning system, and the GLONASS.

According to the conception of the present invention, through proper frequency allocation, the signal in the RF band of a positioning system selected by a user is allowed to pass through, whereas the signal in the RF band of another positioning system unselected by the user is rejected. Accordingly, RF signals of the GPS, the Galileo positioning system, and the GLONASS are processed via a single signal path in order to minimize hardware cost.

Figure 2:
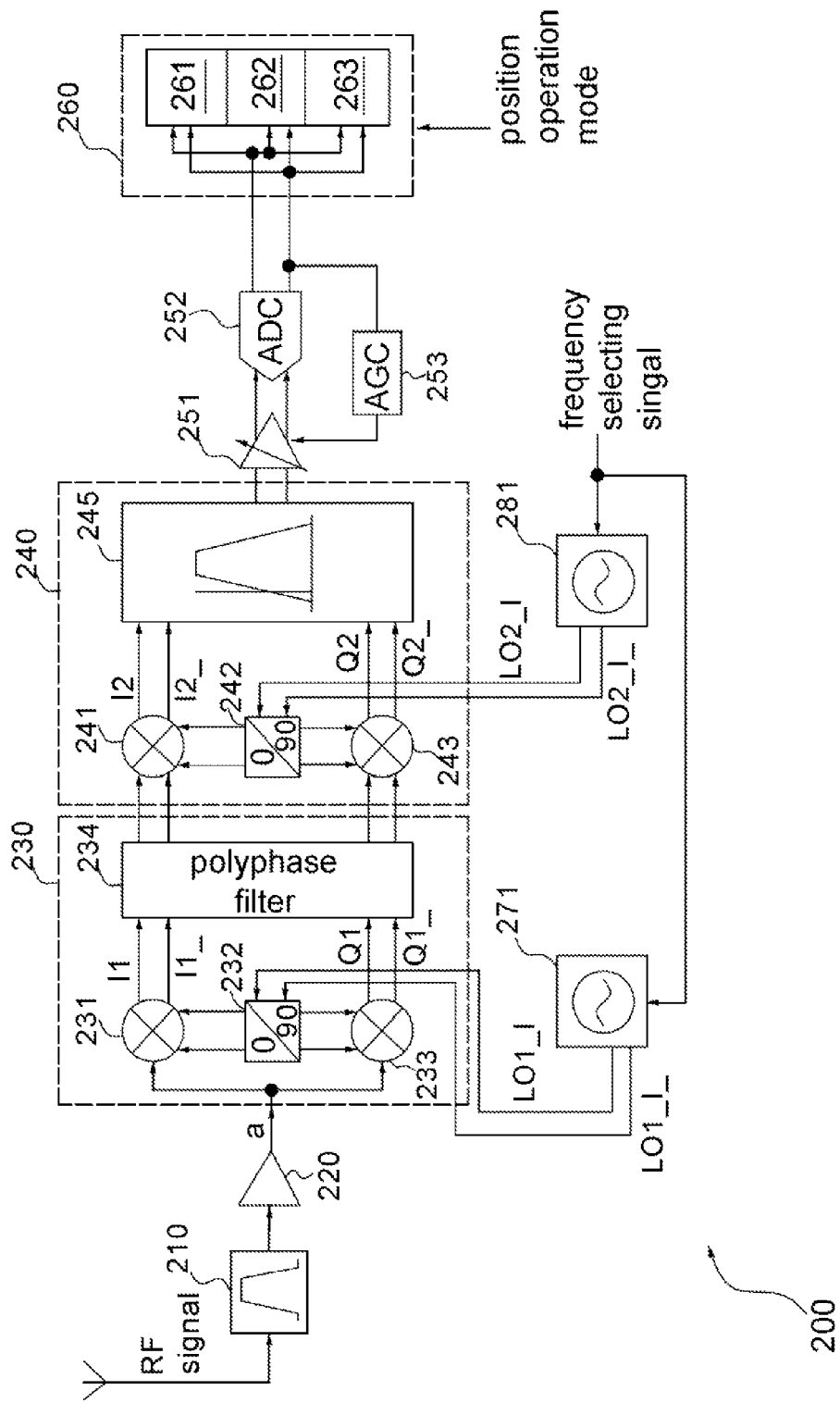
FIG. 2 is a block diagram of a signal processing apparatus for a multi-mode satellite positioning system in accordance with an embodiment of the present invention.

FIG. 2 is a block diagram of a signal processing apparatus for a multi-mode satellite positioning system in accordance with an embodiment of the present invention. A signal processing apparatus 200 for a multi-mode satellite positioning system comprises a band-pass filter 210, a low-noise amplifier 220, two image reject mixers 230 and 240, a variable gain amplifier 251, an automatic gain control (AGC) loop 253, an analog-to-digital converter (ADC) 252, two local oscillators 271 and 281, and a baseband circuit 260. Differential signals taken as an example in FIG. 2 can increase noise immunity; however, the differential signals are not construed as limiting the invention, as a single sideband signal may also be used. The signal processing apparatus 200 for a multi-mode satellite positioning system is used for a GPS mode, a Galileo mode, a GLONASS mode, or a GPS-Galileo multi-mode.

Detailed description of the GPS mode is given below in order to gain a better understanding of this embodiment. When user selects the GPS mode, the band-pass filter 210 receives an RF signal via an antenna, and filters out the received RF signal noises as well as components that are not around 1.5 GHz and 1.6 GHz; that is, the band-pass filter 210 filters signal components that are not covered by the GPS, the Galileo positioning system, and the GLONASS. Next, the low-noise amplifier 220 amplifies the filtered signal outputted by the band-pass filter 210 to an appropriate level. A frequency selecting signal is generated according to a configuration of the multi-mode satellite positioning system and the operation mode determined by the user or detected automatically by the apparatus. The local oscillator 271 receives the frequency selecting signal to generate first differential local oscillation signals LO1_I, and LO1_I_; the local oscillator 281 also receives the frequency selecting signal to generate second differential local oscillation signals LO2_I and LO2_I_. For example, GLONASS is divided into 25 channels; if the GLONASS mode is selected, the local oscillation signals are determined according to the selected channel number or the bandwidth allocated for the selected channel. The GPS and the Galileo system have a same central frequency of 1575.42 MHz, and the GLONASS has a central frequency of 1613.1093 MHz; the frequencies of the first oscillation signals LO1_I and LO1_I_ generated by the local oscillator 271 are defined as 1594.2646 MHz ((1575.42+1613.1093)/2=1594.2646). At this point, the GPS and the Galileo system generate first IF signals having frequencies of 18.8446 MHz (18.8446=1594.2646−1575.42, assuming the received RF is 1575.42 MHz), and a signal generated by the GLONASS is regarded as an image signal.

The image reject mixer 230 comprises a quadrature mixer having double-balanced mixers 231 and 233, a phase shifter 232 and a polyphase filter 234. The phase shifter 232 receives the first oscillation signals LO1_I and LO1_I, and shifts phases of the received signals by 0/90 degrees to generate four signals LO1_I, LO1_I_, LO1_Q and LO1_Q_. The in-phase signal LO1_I and its complementary signal LO1_I_ are inputted into the double-balanced mixer 231, and the quadrature signal LO1_Q and its complementary signal LO1_Q_ are inputted into the double-balanced mixer 233. The double-balanced mixer 231 mixes an output signal from the low-noise amplifier 220, and the in-phase signal LO1_I and the complementary signal LO1_I_ from phase shifter 232, to generate an in-phase signal I1 and a complementary signal I1_ at a first IF of 18.8446 MHz (18.8446=1594.2646−1575.42). Similarly, the double-balanced mixer 233 mixes the output signal from the low-noise amplifier 220, and the in-phase signal LO1_Q and the complementary signal LO1_Q_ from phase shifter 232, to generate a quadrature signal Q1 and a complementary signal Q1_ at the first IF. According to the operation mode, a central frequency of the polyphase filter 234 is defined as being at the first IF. By properly allocating four signals I1, I1_, Q1 and Q1_, phase identification is performed. That is, of the four signals, GPS signals with counter-clockwise phases are passed through and GLONASS signals with clockwise phases are filtered. After that, four quadrature signals FI1, FI1_, FQ1 and FQ1_ (not shown) at the first IF are generated.

In this embodiment, according to the foregoing frequency selecting signal, the local oscillator 281 generates the second oscillation signals LO2_1 and LO2_1_ at 18.8446+bw1 MHz. The bw1 is the bandwidth range corresponding to the first IF signal. In this embodiment, bw1 is equal to 4 MHz such that the second oscillation signals LO2_1 and LO2_1_ are at 22.8446 MHz, and bw1 is adjusted according to a frequency band needed by the operation mode and a decoding requirement of the baseband circuit 260.

The image reject mixer 240 comprises a quadrature mixer having double-balanced mixers 241 and 243, a phase shifter 242 and a complex filter 245. The phase shifter 242 has a same function and operation approach as the phase shifter 232, and the related description shall not be given for brevity. The double-balanced mixer 241 mixes the in-phase signal FI1 at the first IF with its complementary signal FI1_, and the in-phase signal LO2_I of the second oscillation signal with its complementary signal LO2_I, so as to generate an in-phase signal I2 at a second IF of 4 MHz and a complementary signal I2_. The double-balanced mixer 243 mixes the quadrature signal FQ1 at the first IF with the complementary signal FQ1_, and the quadrature signal LO2_Q of the second oscillation signal with the complementary signal LO2_Q_, so as to generate a quadrature signal Q2 at the second IF and a complementary signal Q2_. According to the operation mode, the central frequency of the complex filter 245 is modulated to the second IF of 4 MHz, and a frequency bandwidth bw2 is determined. The bw2 is the bandwidth range corresponding to the first IF signal. The complex filter 245 functions as a band-pass filter. After receiving the four input signals I2, I2_, Q2, and Q2_, the complex filter 245 filters image components by selectively rejecting positive frequency components or negative frequency components of the second IF, and outputs filtered second differential IF signals.

The variable gain amplifier 251 enlarges the filtered second differential IF signal to a fixed level, with a voltage gain of the variable gain amplifier 251 being controlled by an automatic gain control loop 253. The ADC 252 converts output signals from the variable gain amplifier 251 to digital differential signals to be transmitted to the baseband circuit 260.

The baseband circuit 260 comprises a GPS baseband processor 261, a Galileo baseband processor 262 and a GLONASS baseband processor 263. The processors are correspondingly activated according to the operation mode. In this embodiment, since the operation mode is the GPS mode, the baseband circuit 260 only activates the GPS baseband processor 261 to perform a code division multiple access (CDMA) decoding and a subsequent digital signal processing on the inputted digital signals. With respect to signals within a same spectrum covered by the GPS and the Galileo system, since the two systems implement different encoding and multiplexing methods, different output signals are obtained by respectively decoding signals of the two systems when a baseband signal processing is performed.

When the operation mode is the Galileo mode as selected by the user or detected automatically by the apparatus, according to requirements of the Galileo system, the parameters bw1 and bw2 are theoretically greater than the values defined under the GPS mode and need to be adjusted accordingly, and the Galileo baseband processor 262 is to be activated by the baseband circuit 260; other parameters and circuit operations under the Galileo mode are the same as those under the GPS mode.

When the operation mode is the GPS-Galileo mode as selected by the user or detected automatically by the apparatus, the baseband circuit 260 simultaneously activates both the GPS baseband processor 261 and the Galileo baseband processor 262, and other parameters and circuit operations under the GPS and Galileo mode are the same as those under the Galileo mode for the reason that the bw1 and bw2 of the Galileo system are greater than those of the GPS.

When the operation mode is the GLONASS mode (supposing that channel 6 is selected), the frequencies of the first oscillation signals LO1_I and, LO1_I_ are defined as 1590.3975 MHz ((1575.42+1602+0.5625×6)/2=1590.3975). At this point, the signal processing apparatus 200 for a multi-mode satellite positioning system adjusts the parameters bw1 and bw2, and defines the central frequency of the polyphase filter 234 as the first IF. Moreover, by properly allocating the four input signals I1, I1_, Q1 and Q1_, phase identification is performed. That is, of the four signals, image components with clockwise phases (i.e., GLONASS signals) are passed through and image components with counter-clockwise phases (i.e., GPS signals) are filtered, so as to generate four quadrature signals FI1, FI1_, FQ1 and FQ1_ at the first IF. Further, the baseband circuit 260 activates the GLONASS baseband processor 263, while other circuit operations under the GLONASS mode are the same as those under the GPS mode.

Figure 3:
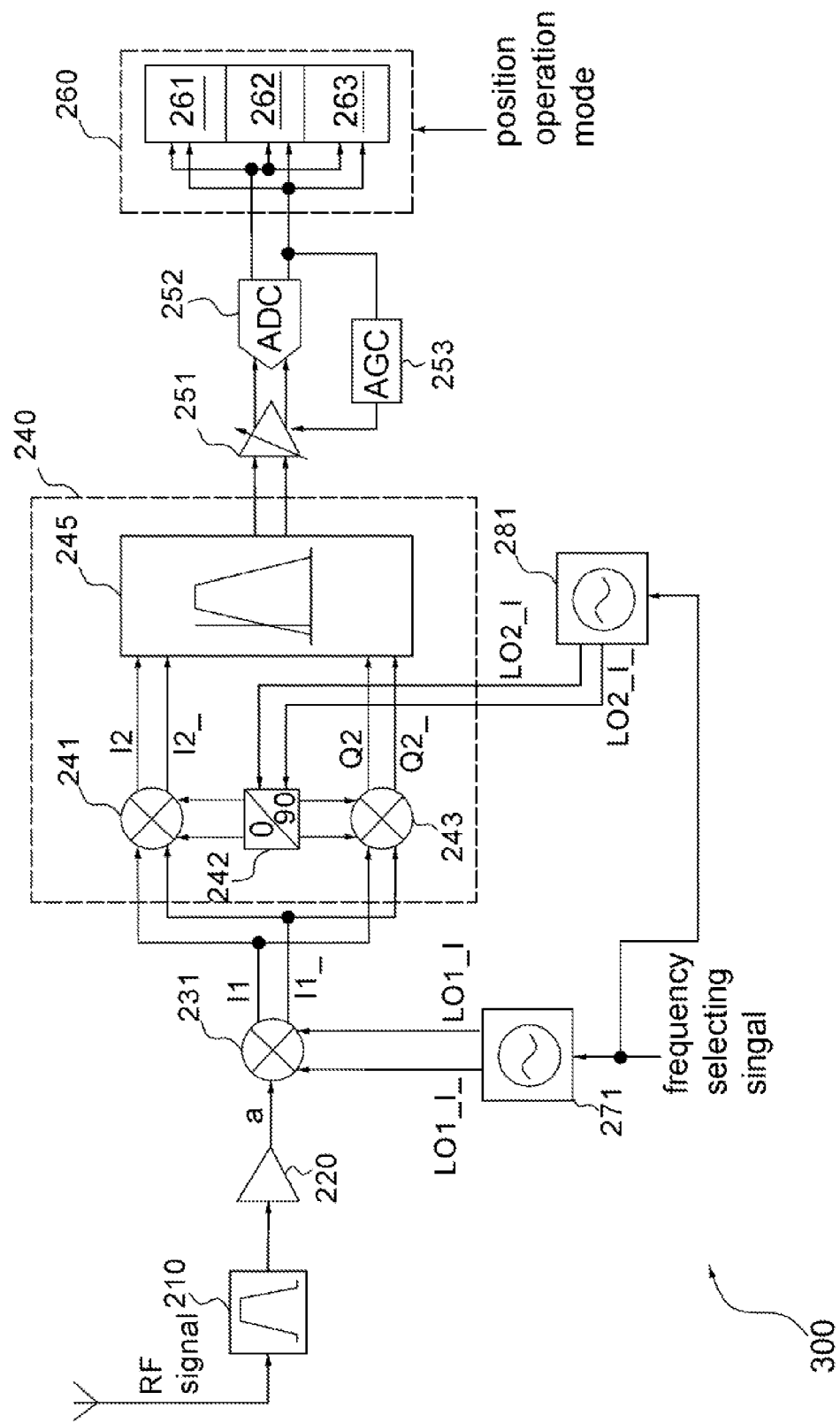
FIG. 3 is a block diagram of a signal processing apparatus for a synchronous multi-mode satellite positioning system in accordance with an embodiment of the present invention.

FIG. 3 is a block diagram of a signal processing apparatus for a synchronous multi-mode satellite positioning system in accordance with an embodiment of the presenting invention. The difference between FIG. 2 and FIG. 3 is that, in a signal processing apparatus 300 for a synchronous multi-mode satellite positioning system, the image reject mixer 230 is replaced with a double-balanced mixer 231, which is to be discussed below. The signal processing apparatus 300 for a multi-mode satellite positioning system provides a GPS-GLONASS multi-mode, a Galileo-GLONASS multi-mode, and a GPS-Galileo multi-mode. Suppose that the GPS-GLONASS multi-mode is selected along with the GLONASS channel 6 in the description below to better understand the embodiment. Partial circuits of the signal processing apparatus 300 for a synchronous multi-mode satellite positioning system are the same as those of the signal processing apparatus 200 for a multi-mode satellite positioning system, and the description shall not to be again given for brevity.

At a first stage of frequency down conversion, in this embodiment, a double-balanced mixer 231 is used for simultaneously conversing frequencies of a GPS signal and a GLONASS signal to a first IF of 14.9775 MHz (14.9775=1590.3975-1575.42), so as to simultaneously receive the GPS signal and the GLONASS signal. Meanwhile, no image component is incurred for the reason that both the GPS signal and the GLONASS signal are needed by the user. It is to be noted that, the GPS signal and the GLONASS are encoded by the CDMA technology at a transmitting end. Therefore, although the GPS signal and the GLONASS signal are overlapped at the first IF of 14.9775 MHz, the subsequent GPS baseband processor 261 and the GLONASS baseband processor 263 may nevertheless respectively obtain corresponding baseband signals after performing CDMA decoding. In addition, the parameters bw1 and bw2 are adjusted on the basis of a positioning mode having a wider spectrum; for example, in this embodiment, the parameters bw1 and bw2 are adjusted on the basis of the GPS mode. Operation approaches of a Galileo-GLONASS multi-mode and a GPS-Galileo-GLONASS multi-mode are similar to those of the GPS-GLONASS multi-mode, and detailed thereof shall not be described for brevity.

Figure 4:
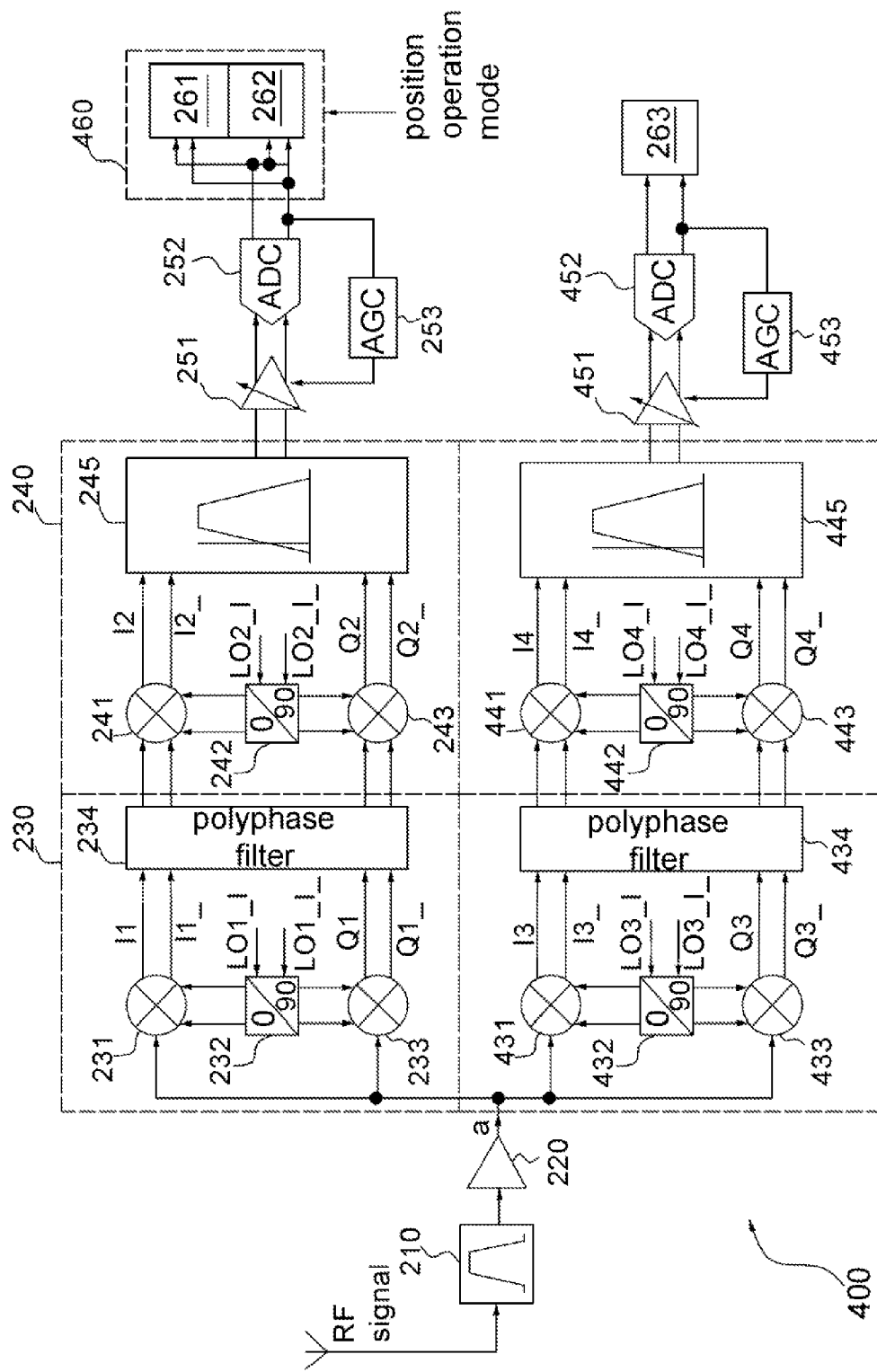
FIG. 4 is a block diagram of a signal processing apparatus for a synchronous multi-mode satellite positioning system in accordance with another embodiment of the present invention.

FIG. 4 is a block diagram of a signal processing apparatus for a synchronous multi-mode satellite positioning system in accordance with another embodiment of the present invention. The difference between FIG. 4 and FIG. 2 and FIG. 3 is that, a signal processing apparatus 400 for a synchronous multi-mode satellite positioning system has an upper signal path and a lower signal path. The two signal paths have almost the same circuit configuration except for a difference between the baseband circuits. The upper signal path is used for processing GPS signals or/and Galileo signals as illustrated at the left side of FIG. 1, and accordingly a baseband circuit 460 comprises a GPS baseband processor 261 and a Galileo baseband processor 262. At this point, the GPS and the Galileo system have a same central frequency of 1574.42 MHz. Therefore, the frequencies of the first oscillation signals LO1_1 and LO1_1 generated by the local oscillator are defined as 1575.42 MHz. The image reject mixer circuit 230 directly reduces an RF signal to a second IF according to the first oscillation signals, so as to generate a second IF signal. The RF signal may also be reduced via a two-stage cascade to a first IF and then to the second IF as illustrated in FIG. 4. The lower signal path is used for processing GLONASS signals as illustrated at the right side of FIG. 1, and accordingly a corresponding baseband circuit comprises a GLONASS baseband processor 263. At this point, an image reject mixer 430 directly reduces the RF signal to the second IF according to a first oscillator generated based on the requirements of the GLONASS, so as to generate a second IF signal. The RF signal may also be reduced via a two-stage cascade to a first IF and then to the second IF as illustrated in FIG. 4. A signal processing apparatus for a synchronous multi-mode satellite positioning system in accordance with another embodiment of the present invention is applicable to one or a combination of the GPS mode, the Galileo mode and the GLONSS mode.

Compared to the foregoing two embodiments, since the signal processing apparatus according to this embodiment has separated signal paths, the signal processing apparatus 400 has a better signal to noise ratio (SNR) than that of the embodiment illustrated in FIG. 3 when the user selects a same multi-mode (except for the GPS-Galileo multi-mode). Therefore, manufacturers may select signal processing apparatuses as disclosed in the different embodiments of the present invention according to a cost consideration or performance requirements.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A signal processing apparatus for a multi-mode satellite positioning system, for receiving a radio frequency (RF) signal to generate a baseband signal corresponding to an operation mode, the signal processing apparatus comprising:
   a band-pass filter, for filtering the RF signal to generate a filtered RF signal;
   a local oscillating circuit, for generating a first oscillation signal and a second oscillation signal according to the operation mode;
   a first mixing circuit, for mixing the first oscillation signal and the filtered RF signal to generate a first mixed signal, and processing the first mixed signal to generate a first intermediate frequency (IF) signal according to the operation mode;
   a second mixing circuit, for mixing the second oscillation signal and the first IF signal to generate a second mixed signal, and filtering out image rejection components from the second mixed signal to generate a second IF signal;
   an analog-to-digital converter (ADC), for converting the second IF signal to a digital signal; and
   a baseband circuit, comprising a plurality of baseband processors, coupled to the ADC for receiving the digital data and activating one of the baseband processors to generate the baseband signal by decoding the digital signal according to the operation mode.

2. The signal processing apparatus as claimed in claim 1, wherein the first mixing circuit comprises:
   a first phase shifter, for receiving the first oscillation signal and performing a phase shift on the first oscillation signal to generate an first in-phase oscillation signal and a first quadrature oscillation signal;
   a first quadrature mixer, for mixing the filtered RF signal and the first in-phase oscillation signal to generate a first in-phase mixed signal, and mixing the filtered RF signal and the first quadrature oscillation signal to generate a first quadrature mixed signal; and
   a polyphase filter, coupled to the first quadrature mixer, for determining a central frequency according to the operation mode and filtering mirror signals from the first in-phase mixed signal and the first quadrature mixed signal to generate the first IF signal.

3. The signal processing apparatus as claimed in claim 2, wherein the first quadrature mixer comprises two double-balanced mixers.

4. The signal processing apparatus as claimed in claim 1, wherein the second mixing circuit comprises:
   a second phase shifter, for receiving and performing a phase shift on the second oscillation signal to generate a second in-phase oscillation signal and a second quadrature oscillation signal;
   a second quadrature mixer, for mixing the first IF and the second in-phase oscillation signal to generate a second in-phase mixed signal, and mixing the first IF and the second quadrature oscillation signal to generate a second quadrature mixed signal; and
   a complex filter, coupled to the second quadrature mixer, for filtering image components from the second in-phase mixed signal and the second quadrature mixed signal to generate the second IF signal.

5. The signal processing apparatus as claimed in claim 4, wherein the second quadrature mixer comprises two double-balanced mixers.

6. The signal processing apparatus as claimed in claim 1, wherein the local oscillator circuit comprises a first local oscillator circuit for generating the first oscillation signal, and a second local oscillator circuit for generating the second oscillation signal.

7. The signal processing apparatus as claimed in claim 1, further comprising:
   a variable gain amplifier, coupled to the second mixer for amplifying the second IF signal.

8. The signal processing apparatus as claimed in claim 1, wherein the operation mode is a Global Positioning System (GPS) mode, a Galileo mode, a Global Navigation System (GLONASS), or a GPS-Galileo mode.

9. The signal processing apparatus as claimed in claim 8, wherein the baseband circuit comprises a GPS baseband processor, a Galileo baseband processor, and a GLONASS baseband processor.

10. The signal processing apparatus as claimed in claim 1, wherein the first oscillation signal has a first oscillation signal frequency between two different central frequencies of two satellite positioning systems.

11. The signal processing apparatus as claimed in claim 9, wherein the first oscillation signal frequency is 1594.2646 MHz.

12. A signal processing apparatus for a multi-mode satellite positioning system, for receiving an radio frequency (RF) signal, and generating a baseband signal corresponding to an operation mode, the signal processing apparatus comprising:
   a band-pass filter, for filtering the RF signal to generate a filtered RF signal;
   a local oscillating circuit, for generating an oscillation signal according to a central frequency determined by the operation mode;
   a mixing circuit, for mixing the oscillator signal and the filtered RF signal to generate an intermediate frequency (IF) signal;
   an ADC, for performing an analog-to-digital-processing on the IF signal to generate a digital signal; and
   a baseband circuit, comprising a plurality of baseband processors, for activating one of the baseband processors to generate the baseband signal by decoding the digital signal according to the operation mode;
   wherein the mixing circuit comprises:
      a phase shifter, coupled to the local oscillating circuit for receiving the oscillation signal, and performing a phase shift on the oscillation signal to generate an in-phase oscillation signal and a quadrature oscillation signal;
      a quadrature mixer, for mixing the filtered RF signal and the in-phase oscillation signal to generate an in-phase mixed signal, and mixing the filtered RF signal and the quadrature oscillation signal to generate a quadrature mixed signal; and
      a filter, coupled to the quadrature mixer, for determining a central frequency and filtering image components from the in-phase mixed signal and the quadrature mixed signal to generate the IF signal.

13. The signal processing apparatus as claimed in claim 12, wherein the quadrature mixer comprises two double-balanced mixers.

14. The signal processing apparatus as claimed in claim 12, further comprising a variable gain amplifier for amplifying the IF signal.

15. The signal processing apparatus as claimed in claim 12, wherein the operation mode is a GPS mode, a Galileo mode, or a GPS-Galileo multi-mode, and the baseband circuit comprises a GPS baseband processor and a Galileo baseband processor.

16. A signal processing method for a multi-mode satellite positioning system, for receiving a radio frequency (RF) signal to generate a baseband signal corresponding to an operation mode, the signal processing method comprising:

filtering from the RF signal components uncovered by the multi-mode satellite positioning system to generate a filtered RF signal;

generating a first oscillation signal and a second oscillation signal according to the operation mode;

mixing the first oscillation signal and the filtered RF signal to generate a first mixed signal, and processing the first mixed signal to generate a first intermediate frequency (IF) signal according to the operation mode;

mixing the second oscillator signal and the first IF signal to generate a second mixed signal, and filtering out image rejection components from the second mixed signal to generate a second IF signal;

converting the second IF signal to a digital signal; and performing a baseband signal processing on the digital signal to generate the baseband signal.

17. The signal processing method as claimed in claim 16, wherein the operation mode is a GSP mode, a Galileo mode, a GLONASS mode, or a GPS-Galileo multi-mode.

18. The signal processing method as claimed in claim 16, wherein the first oscillation signal has a first oscillation signal frequency between two different central frequencies of two satellite positioning systems.

\* \* \* \* \*